United States Patent
Sevindik et al.

(10) Patent No.: US 11,019,563 B1
(45) Date of Patent: May 25, 2021

(54) CUSTOMER PREMISES EQUIPMENT (CPE) SELF-ORGANIZATION IN FIXED WIRELESS ACCESS (FWA) NETWORK

(71) Applicant: Charter Communications Operating, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/744,000

(22) Filed: Jan. 15, 2020

(51) Int. Cl.
- H04W 4/00 (2018.01)
- H04W 48/16 (2009.01)
- H04W 76/10 (2018.01)

(52) U.S. Cl.
CPC ........... H04W 48/16 (2013.01); H04W 76/10 (2018.02)

(58) Field of Classification Search
CPC .............................. H04W 48/16; H04W 76/10
USPC ......................................................... 455/434
See application file for complete search history.

(56) References Cited

U.S. PATENT DOCUMENTS

| | | | |
|---|---|---|---|
| 8,200,212 B2 * | 6/2012 | Rappaport | H04B 7/0413 455/426.2 |
| 8,897,702 B2 * | 11/2014 | Niu | H04B 17/345 455/41.1 |
| 9,826,570 B1 | 11/2017 | Gupta et al. | |
| 9,854,004 B2 | 12/2017 | Bharadwaj | |
| 10,492,204 B2 * | 11/2019 | Kakinada | H04L 69/18 |
| 10,623,943 B1 | 4/2020 | Sevindik et al. | |
| 10,708,857 B2 * | 7/2020 | Dhillon | H04W 48/16 |
| 2004/0090971 A1 * | 5/2004 | Anderson, IV | H04L 65/1026 370/401 |
| 2008/0155589 A1 | 6/2008 | McKinnon et al. | |

(Continued)

FOREIGN PATENT DOCUMENTS

| WO | WO2017136959 A1 | 8/2017 |
|---|---|---|
| WO | 2020070716 A1 | 4/2020 |

OTHER PUBLICATIONS

Daoud et al., "On the Performance of CBRS Fixed Wireless Access: Coverage and Capacity Field Study", Sep. 2019, 41 pages, https://www.nctatechnicalpapers.com/Paper/2019/2019-on-the-performance-of-cbrs-fixed-wireless-access.

(Continued)

*Primary Examiner* — Amancio Gonzalez
(74) *Attorney, Agent, or Firm* — Otterstedt, Wallace & Kammer, LLP

(57) ABSTRACT

A method, performed by a first customer premises equipment (CPE) at a first customer premises within a fixed wireless access (FWA) network comprising a plurality of base stations, includes: connecting remotely over a first interface to a first base station of the FWA network, providing access over the first interface to the FWA network to at least a first client device locally connected to the first CPE at the first customer premises, and receiving information over a second interface from a second CPE at a second customer premises within the FWA network to modify operation of at least the first CPE. The second CPE provides access to the FWA network to at least a second client device locally connected to the second CPE at the second customer premises, and the information received from the second CPE over the second interface comprises information about operation of the second CPE.

20 Claims, 7 Drawing Sheets

(56) References Cited

U.S. PATENT DOCUMENTS

| | | |
|---|---|---|
| 2009/0187480 A1 | 7/2009 | Bernard et al. |
| 2011/0264530 A1 | 10/2011 | Santangelo et al. |
| 2015/0295692 A1 | 10/2015 | Gowda et al. |
| 2016/0135213 A1 | 5/2016 | Zhu et al. |
| 2017/0134994 A1 | 5/2017 | Chinthalapudi et al. |
| 2018/0026903 A1 | 1/2018 | Kotreka et al. |
| 2018/0027567 A1 | 1/2018 | Saghir et al. |
| 2018/0097585 A1 | 4/2018 | Dev et al. |
| 2018/0270649 A1 | 9/2018 | Tsai et al. |
| 2019/0045397 A1 | 2/2019 | Mueck et al. |
| 2019/0058999 A1 | 2/2019 | Gunasekara et al. |
| 2019/0069004 A1 | 2/2019 | Badawiyeh |
| 2019/0069224 A1 | 2/2019 | Lee et al. |
| 2019/0082446 A1 | 3/2019 | Guo et al. |
| 2019/0090309 A1 | 3/2019 | Wong et al. |
| 2019/0115950 A1 | 4/2019 | Kakinada et al. |
| 2019/0116239 A1 | 4/2019 | Jagannath et al. |
| 2019/0150134 A1 | 5/2019 | Kakinada et al. |
| 2019/0223025 A1 | 7/2019 | Kakinada et al. |
| 2019/0230500 A1 | 7/2019 | Goncalves |
| 2019/0294829 A1 | 9/2019 | Zhou |
| 2019/0364565 A1 | 11/2019 | Hmimy et al. |
| 2019/0372689 A1 | 12/2019 | Carter et al. |
| 2020/0008007 A1 | 1/2020 | Belghoul et al. |
| 2020/0008143 A1 | 1/2020 | Jain et al. |
| 2020/0008196 A1 | 1/2020 | Low et al. |
| 2020/0037211 A1 | 1/2020 | Hinc et al. |
| 2020/0068647 A1 | 2/2020 | Jha et al. |
| 2020/0100098 A1 | 3/2020 | Bai et al. |
| 2020/0107293 A1 | 4/2020 | Cui et al. |
| 2020/0112851 A1 | 4/2020 | Wane |
| 2020/0146032 A1 | 5/2020 | Bae et al. |
| 2020/0169858 A1 | 5/2020 | Hu et al. |
| 2020/0329523 A1 | 10/2020 | Yi et al. |

OTHER PUBLICATIONS

3rd Generation Partnership Project (3GPP), Technical Specification (TS) Group Services and System Aspects, "General Packet Radio Service (GPRS) enhancements for Evolved Universal Terrestrial Radio Access Network (E-UTRAN) access", TS 23.401 V16.5.0, Dec. 2019, 423 pages, http://www.3gpp.org/ftp//Specs/archive/23_series/23.401/23401-g30.zip.

The Software Defined Radio Forum Inc., Spectrum Sharing Committee Work Group 1 (WG1), "CBRS Operational and Functional Requirements", WINNF-TS-0112-V1.9.0, Dec. 2019, 81 pages, https://winnf.memberclicks.net/assets/CBRS/WINNF-TS-0112.pdf.

CBRS Alliance, "CBRS Network Services Use Cases and Requirements", CBRSA-TS-1001 V2.0.0, Dec. 2018, 37 pages, https://www.cbrsalliance.org/wp-content/uploads/2018/12/CBRSA-TS-1001-V2.0.0_Published-December-112c-2018.pdf.

CBRS Alliance, "CBRS Network Services Stage 2 and 3 Specification", CBRSA-TS-1002 V2.0.0, Feb. 2019, 52 pages, https://www.cbrsalliance.org/wp-content/uploads/2019/04/CBRSA-TS-1002-V2.0.0_Published-April-5-2019.pdf.

Volkan Sevindik et al., unpublished U.S. Appl. No. 16/777,751, filed Jan. 30, 2020, Data Transfer Using a Dual SIM Phone pp. 1-31 and 10 sheets drawings.

Fierce Wireless, Charter's MVNO counts 21,000 lines as executives hint at eSIM plans a . . . , Oct. 26, 2018, pp. 1-5, https://www.fiercewireless.com/wireless/charter-s-mvno-counts-21-000-I . . . .

Fierce Wireless, Charter updates MVNO progress, explores dual SIM connectivity, May 1, 2019, pp. 1-4, https://www.fiercewireless.com/wireless/charter-updates-mvno-progress . . . .

The Wireless Innovation Forum, Copyright 2018, Acronyms and Definitions Pertaining to Commercial Operations in the U.S. 3550-3700 MHz Band, pp. 1-10.

Wikipedia, "Phablet," last edited on Nov. 3, 2019, pp. 1-14, https://en.wikipedia.org/wiki/Phablet.

Volkan Sevindik et al., unpublished U.S. Appl. No. 16/807,054, filed Mar. 2, 2020, Dual Subscriber Identification Module (SIM) Customer Premises Equipment (CPE) for Wireless Network Power Measurements pp. 1-31 and 7 sheets drawings.

OnQ Blog, Multi-SIM smartphones to enhance your 5G experience, Nov. 18, 2019, https://www.qualcomm.com/news/onq/2019/11/18/multi-sim-smartphones-enhance-your-5g-experience, pp. 1-7.

Android Central, What is dual 4G LTE, and why should you care? 3 Pages, Downloaded From https://www.androidcentral.com/what-dual-4g-lte-and-why-should-you-care, Dated Jul. 5, 2018.

Mediatek, Dual SIM, Dual 4G VoLTE Smartphones, https://www.mediatek.com/features/dual-4g-volte, 3 Pages, Downloaded Sep. 17, 2019.

Official Android Blog: Android 5.1: Unwrapping a new Lollipop update, pp. 1-3, Dated Mar. 9, 2015, https://android.googleblog.com/2015/03/android-51-unwrapping-new-lollipop.html.

Verizon Wireless, Apple® iPhone®—Turn Voice & Data On / Off—HD Voice, https://www.verizonwireless.com/support/knowledge-base-206984/, 3 Pages, Downloaded Sep. 17, 2019.

Wikipedia, "Dual SIM," last edited on Nov. 6, 2019, pp. 1-6, https://en.wikipedia.org/wiki/Dual_SIM.

Volkan Sevindik et al., unpublished U.S. Appl. No. 16/744,000, filed Jan. 15, 2020, Customer Premises Equipment (CPE) Self-Organization in Fixed Wireless Access (FWA) Network pp. 1-29 and 7 sheets drawings.

Authorized Officer Harry C. Kim PCT Application PCT/US2020/055963 International Search Report and Written Opinion of the ISA, 8 Pages Total, dated Dec. 21, 2020.

* cited by examiner

US 11,019,563 B1

CUSTOMER PREMISES EQUIPMENT (CPE) SELF-ORGANIZATION IN FIXED WIRELESS ACCESS (FWA) NETWORK

FIELD OF THE INVENTION

The present invention relates generally to the electrical, electronic, and computer arts, and more particularly relates to enhancements in wireless communications.

BACKGROUND OF THE INVENTION

Conventional LTE (Long Term Evolution) generally uses licensed radio frequency (RF) spectrum for communications between mobile devices and cellular networks. A new unlicensed (shared) spectrum scheme is being introduced in the United States at 3.5 GHz (gigahertz) called CBRS (Citizens Broadband Radio Service). Licensed spectrum and unlicensed spectrum can be used for third generation (3G), fourth generation (4G), and even fifth generation (5G) wireless communications.

FIG. 1 shows an exemplary instance of fixed wireless access (FWA) suitable for use with an illustrative embodiment of the invention. In FWA, a radio base is installed on a tower 131 that delivers high speed wireless internet via RF signals 121 to customer premises equipment (CPE) 111 attached on the outside (e.g., rooftop) of premises 190, e.g., a location at which service is provided. Base 131 may include, for example, an LTE eNodeB and/or a CBRS device (CBSD). CPE 111 and/or base 131 may be owned and/or operated by a mobile network operator (MNO) and/or a multiple system operator (MSO).

CPE 111, which may comprise an outdoor wireless antenna (OWA) and a subscriber identity module (SIM), is coupled to one or more routers 119, typically located inside the building 190, which provides network connectivity to one or more wireless devices 191 (e.g., mobile phone, tablet, laptop computer, etc.) and/or one or more wired devices 192 (e.g., desktop computer, landline telephone or fax, television set) are coupled. One or more of the routers 190 may also include, for example, a wireless (e.g., Wi-Fi) access point, an Ethernet switch, a VOIP (voice over internet protocol) gateway, a residential gateway (RG), and/or a cable modem.

One skilled in the art will understand that, in some arrangements, one or more of the routers 190 may be located outside of the premises (e.g., to provide connectivity to a yard), and/or CPE 111 may be located inside the premises 190 (e.g., near a window or other aperture). In some arrangements, CPE 111 may be integrated with one or more of the routers 190, with the combined device being located either outside (e.g., on a roof) or inside (e.g., near a window) of the premises.

Generally, a given CPE 111 can only connect to a single base 131 at a given time. However, there are often multiple bases 131 which a given CPE 111 can choose from at a given time. For example, CPE 111 may be within range of several bases 131 disposed on respective radio towers. In such circumstances, the CPE 111 typically connects to the base 131 with the strongest signal 121, e.g., best RSRP (Reference Signal Receive Power). However, purely power-based selection may be sub-optimal because, for example, the base (e.g., CBSD) 131 having the most powerful signal 121 may not have the resources available to satisfy the requirements of CPE 111. Conventional arrangements fail to account for the specific resource requirements of CPE 111, much less for other CPEs on the network. Thus, there is a long-felt but unmet need for a dynamic radio selection methodology which ensures that each CPE on the network receives optimal service.

SUMMARY OF THE INVENTION

An aspect includes a method performed by a first customer premises equipment (CPE) at a first customer premises within a fixed wireless access (FWA) network comprising a plurality of base stations. The method includes connecting remotely over a first interface to a first base station of the FWA network, providing access over the first interface to the FWA network to at least a first client device locally connected to the first CPE at the first customer premises, and receiving information over a second interface from a second CPE at a second customer premises within the FWA network to modify operation of at least the first CPE. The second CPE provides access to the FWA network to at least a second client device locally connected to the second CPE at the second customer premises, and the information received from the second CPE over the second interface comprises information about operation of the second CPE.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments may improve user experience, e.g., when using the CBRS spectrum for data and voice connectivity and communications. For example, one or more embodiments may prevent a user from being disconnected or experiencing a degraded level of quality of service (QoS) if the unlicensed spectrum connection becomes degraded or untenable.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
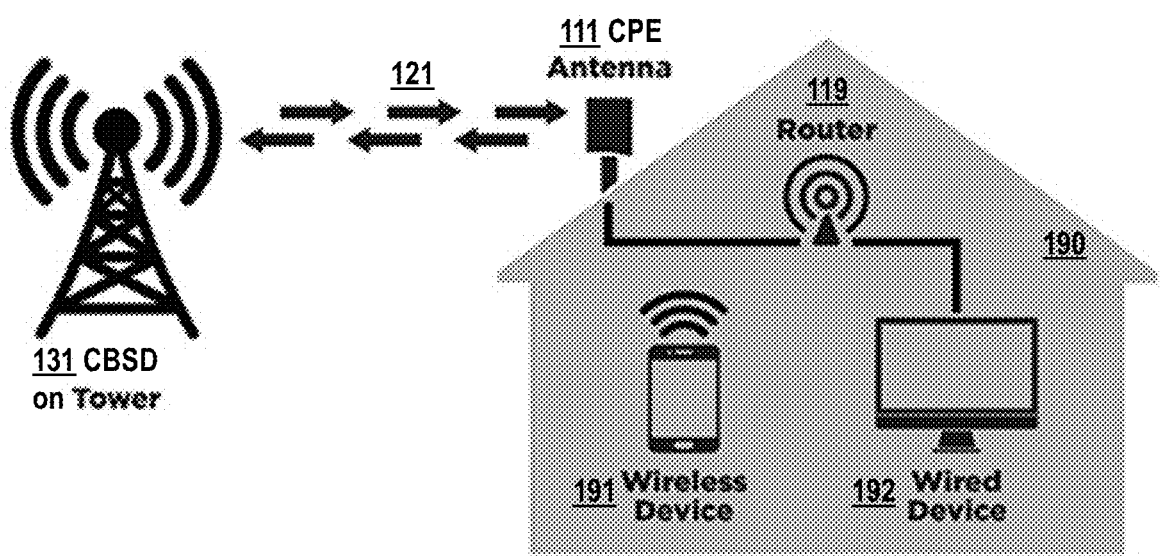
FIG. 1 shows an exemplary instance of fixed wireless access (FWA) suitable for use with an illustrative embodiment of the invention.

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, and other wireless data standards, including GSM, UMTS, CDMA2000, etc. (as applicable).

Reference is made herein to various 3rd Generation Partnership Project (3GPP) Technical Specifications (TS), including 3GPP TS 22.278 and 3GPP TS 23.401, all versions of which are expressly incorporated herein by reference in their entireties for all purposes. These references should generally be construed as indicating the most recently published versions of these specifications as of the filing date of the present application, usually Release 15 and/or Release 16. However, one skilled in the art will understand that earlier versions of these specifications, as well as other related documents not specifically referred to herein, may also be used when implementing aspects of the present invention. All versions of the aforementioned 3GPP Technical Specifications, including but not limited to versions associated with Releases 15 and 16, are expressly incorporated herein by reference in their entireties for all purposes.

As used herein, the term "CBRS" refers to, without limitation and as applicable, any of the variants of the Citizens Broadband Radio Service wireless communication standard(s) including those issued by the Federal Communications Commission (FCC), the CBRS Alliance, OnGo, and/or WinnForum, all versions of which are expressly incorporated herein by reference in their entireties for all purposes. These references should generally be construed as indicating the most recently published versions of these specifications as of the filing date of the present application. However, one skilled in the art will understand that earlier versions of these specifications, as well as other related documents not specifically referred to herein, may also be used when implementing aspects of the present invention.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include mobile virtual network operators (MVNOs), mobile virtual network aggregators (MNVAs), and mobile virtual network enablers (MVNEs).

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0, OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "Wi-Fi" refers to, without limitation and as applicable, any of the variants of IEEE Std. 802.11 or related standards including 802.11 a/b/g/n/s/v/ac or 802.11-2012/2013, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, analog cellular, CDPD, satellite systems, millimeter wave or microwave systems, acoustic, and infrared (i.e., IrDA).

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

For simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

An illustrative embodiment of the present invention may utilize Citizens Broadband Radio Service (CBRS) spectrum which is controlled by a spectrum access system (SAS). CBRS spectrum is a type of unlicensed spectrum or shared spectrum which is shared between multiple entities including government users (such as the military), licensed users, and non-licensed users. CBRS is a multi-tiered wireless band between 3.550 MHz and 3.700 MHz. In particular, CBRS is a three-tiered access framework including incumbent users (i.e., federal, military, and the like), priority access users (winning auction bidders), and general authorized access users, where the general users are permitted to use any portion of the CBRS spectrum not assigned to a higher tier user and may also operate opportunistically on unused priority access spectrum. Availability of CBRS spectrum dynamically changes depending on use by higher priority entities. Higher tier users are protected from lower tier users using a centralized spectrum access system (SAS), which may be a federal or commercial entity.

The SAS authorizes or grants spectrum to access points known as CBRS Devices (CBSDs) and performs interference management to protect higher tier users. This protection may include, for example, dropping CBSDs which are general authorized access users. Each CBSD may have sectors which provide wireless communications coverage. In summary, CBRS is an interference limited network which means that the performance of the network and the data sent to CBRS subscribers is limited by the amount of interference the CBRS users or subscribers experience in the frequency band of operation.

As previously noted, FIG. 1 shows an exemplary instance of fixed wireless access (FWA) suitable for use with an illustrative embodiment of the invention. Although illustrative embodiments are discussed herein primarily with reference to CBRS, embodiments of the present invention may be utilized with other unlicensed and/or licensed spectrum schemes. Communication 121 may utilize a frequency band and/or encoding scheme other than CBRS. Base 131 in FIG. 1 may be implemented as, for example, an LTE eNodeB in addition to or instead of as a CBSD.

From the perspective of base station (e.g., eNodeB and/or CBRS) 131, the CPE 111 is viewed as an end-user client device (user equipment) similar to a mobile phone: indeed, CPE 121 includes a SIM. However, CPE 121 is not actually an end-user client device similar to a mobile phone. Rather, from the perspective of the mobile phone, and more generally from the perspective of end-user client devices 191 and 192, CPE 111 is viewed as a base station through which the user equipment 191 and 192 accesses the network 121. Thus, CPE 111 is connected locally (e.g., at customer premises 190) to client devices 191 and 192, and CPE 111 is connected remotely 121 to base station 131. Base station 131 provides network access 121 to CPE 111, and CPE 111 in turn provides network access to client devices 191 and 192.

Figure 2:
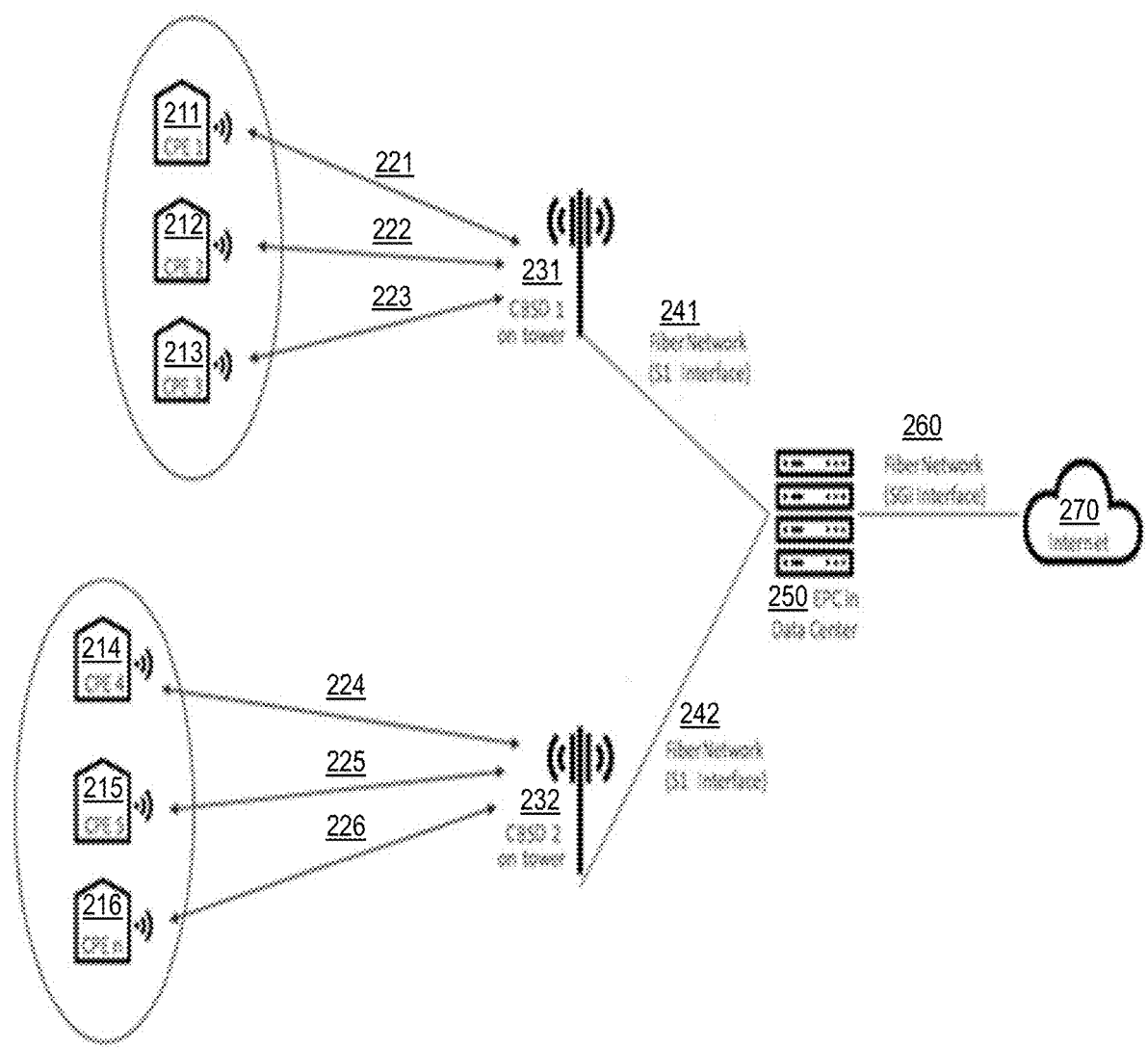
FIG. 2 shows an exemplary FWA network architecture suitable for use with an illustrative embodiment of the invention.

FIG. 2 shows an exemplary FWA network architecture suitable for use with an illustrative embodiment of the invention. Each CPE 211-216 in FIG. 2 generally corresponds to CPE 111 in FIG. 1, and each may be assumed to be coupled to premises, router(s), and device(s) in a manner similar to that discussed above with reference to 119, 190, 191, and 192 in FIG. 1. The FIG. 2 architecture includes two base stations 231 and 232 coupled to respective towers, each having functionality similar to 131 in FIG. 1.

In FIG. 2, CPEs 211-213 are connected to base station 231 via respective connections 221-223, and CPEs 214-216 are connected to base station 232 via respective connections 224-226. However, any of the CPEs 211-216 is capable of connecting to either base station 231 or 232 and can switch from one base station to the other at any time; however, each CPE can only connect to one base station at a time. Connections 221-226 may be implemented using CBRS, in which case 231 and 232 operate as CBSDs as shown in FIG. 2. Additionally or alternatively, connections 221-226 may be implemented using LTE, e.g., as UU interfaces, in which case 231 and 232 operate as eNodeBs as further discussed below with reference to FIG. 3.

CBSDs (and/or eNodeBs) 231 and 232 are coupled via fiber network 241 and 242 to an evolved packet core (EPC) 250, which may be located in a data center (e.g., of an MNO and/or MSO). EPC 250 is coupled to Internet 270 via fiber network 260. EPC 250 may operate in accordance with LTE, in which case 260 may implement an SGi interface while 241 and 242 may implement S1 interfaces, as further described below with reference to FIG. 3.

Figure 3:
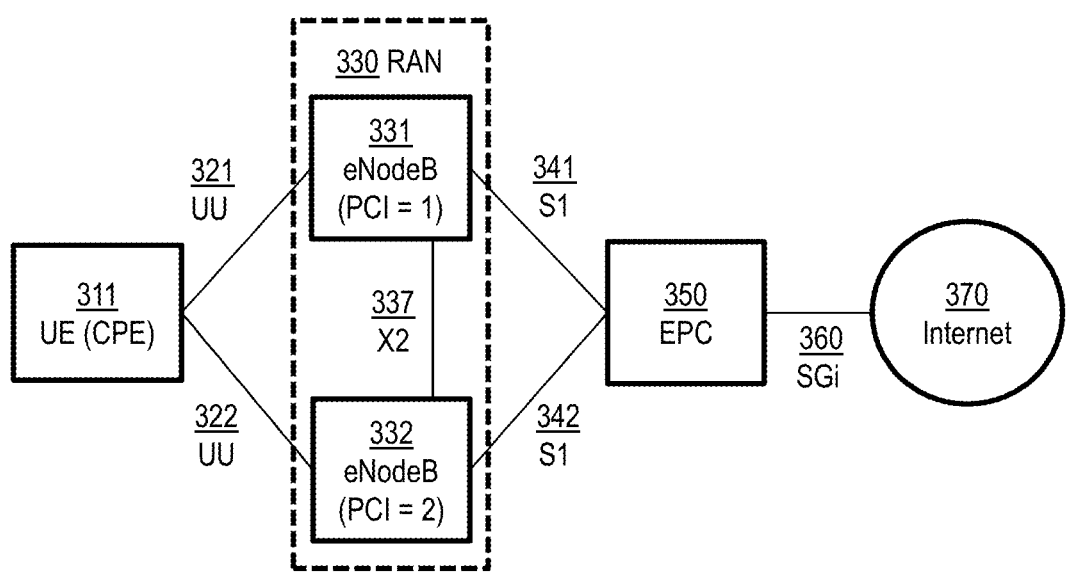
FIG. 3 shows an exemplary LTE network architecture suitable for use with an illustrative embodiment of the invention.

FIG. 3 shows an exemplary LTE network architecture suitable for use with an illustrative embodiment of the invention. Elements 311-370 generally correspond to elements 211-270 discussed above with reference to FIG. 2. Further description of the elements and interfaces shown in FIG. 3 may be found in the LTE standard(s), e.g., 3GPP TS 23.401, which is incorporated by reference herein. In a typical LTE deployment, user equipment (UE) 311 would denote an end-user client device, such as a mobile phone. However, in the FWA context discussed herein, the CPE (e.g., 111 in FIG. 1 or 221-226 in FIG. 2) is viewed as UE 311 rather than the end-user client devices (e.g., 191 and 192 in FIG. 1).

Radio access network (RAN) 330 includes a plurality of base stations (eNodeBs) 331 and 332 to which UE (CPE) 311 can connect via UU interfaces 321 and 322. In an embodiment implemented using CBRS, eNodeBs 331 and 332 may also be CBSDs. A given UE or CPE 311 can only connect to a single eNodeB/CBSD (either 331 or 332) and a single UU interface (either 321 and 322) at a given time, but the UE/CPE 311 can switch from one eNodeB/CBSD and UU interface to another at any time. Each eNodeB/CBSD has a unique physical cell identity (PCI) assigned thereto. eNodeB/CBSD 331 has a PCI of 1 and thus may be referred to herein as CBSD1, and eNodeB/CBSD 332 has a PCI of 2 and thus may be referred to herein as CBSD2.

CBSDs/eNodeBs 331 and 332 are interconnected within RAN 330 by X2 interface 337. CBSDs/eNodeBs 331 and 332 are connected via S1 interfaces 341 and 342 to an evolved packet core (EPC) 350. EPC 350 may be as described in the LTE standard(s), e.g., 3GPP TS 22.278, which is incorporated by reference herein. EPC 350 is coupled to Internet 370 via SGi interface 370.

As previously, each CPE can only connect to one CBSD at a time, though at any time it can choose to disconnect from its current CBSD and connect to another CBSD. In prior art arrangements, each CPE only has information regarding the resource requirements of only one CPE (itself) and the available resources of at most one CBSD (that which it is currently connected to). Because the CPE only has information regarding the available resources of the CBSD it is already connected to (and not available resources of other CBSDs it could connect to instead), it cannot determine whether another CBSD would have more resources available to be better able to satisfy that CPE's specific requirements.

Moreover, because the CPE only has information regarding its own resource requirements (and not resource requirements of other CPEs on the network), it cannot consider how its choice of CBSD will impact the ability of other CPEs to meet their resource requirements. Thus, there is a long-felt but unmet need for a dynamic radio selection methodology which can optimize the overall quality of service for the entire network by considering the available resources of each CBSD and the resource requirements of each CPE.

Illustrative embodiments solve these problems and provide technical advantages relative to the prior art. In illustrative embodiments of the present invention, as opposed to conventional arrangements, CPEs can exchange information with one another, thus allowing a CPE to obtain information from other CPEs regarding their resource requirements and the available resources of multiple CBSDs. Thus, a CPE can acquire information regarding the entire network (including available resources of all CBSDs and resource requirements for all CPEs), which allows the CPE to select a CBSD in a manner which optimizes the overall quality of service for the network by considering the available resources of each CBSD and the resource requirements of each CPE. This new capability allows the CPEs (e.g., 221-226 in FIG. 2) to form a self-organizing network.

Figure 4:
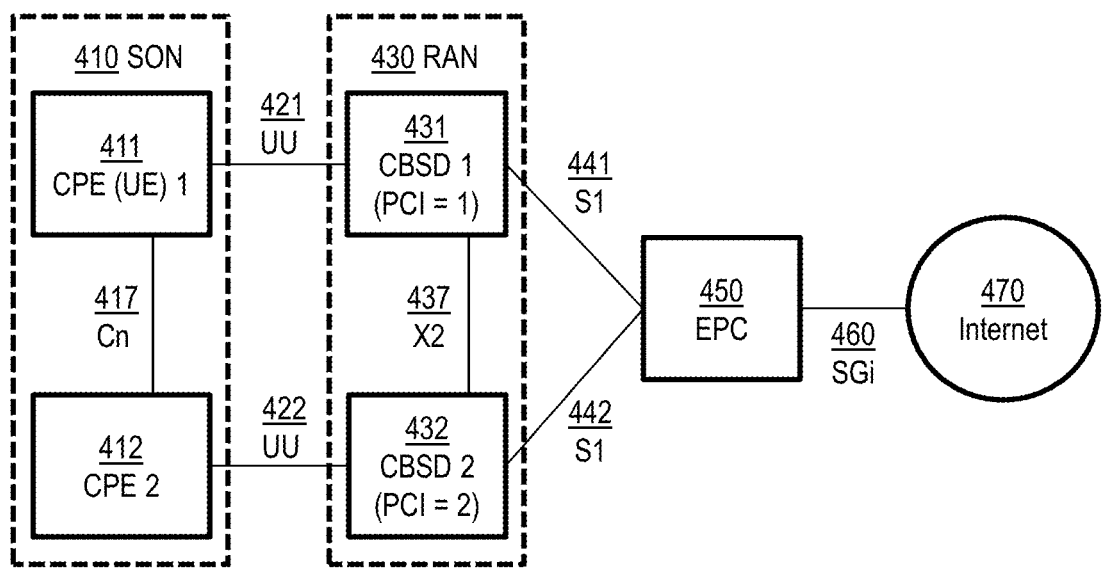
FIG. 4 shows an exemplary network architecture in accordance with one or more aspects of the invention.

FIG. 4 shows an exemplary network architecture in accordance with one or more aspects of the invention. Elements 421-470 correspond generally to elements 321-370 discussed above with reference to FIG. 3, as well as to elements 221-270 discussed above with reference to FIG. 2. However, the FIG. 4 arrangement includes a self-organizing network 410 comprised of CPEs 411 and 412. CPEs 411 and 412 are connected to respective CBSDs 431 and 432 over respective UU interfaces 421 and 422. Moreover, within SON 410, CPEs 411 and 412 are interconnected by a new interface Cn 417.

As previously discussed, an FWA CPE (e.g., 121 in FIG. 1) may be considered to be somewhat of a hybrid having some characteristics of both user equipment (an end user-client device such as a mobile phone, e.g., 191 in FIG. 1 or 311 in FIG. 3) and a base station (an eNodeB or CBSD, e.g., 131 in FIG. 1 or 331 in FIG. 3, see 131 in FIG. 1). Accordingly, from the perspective of the base station, the CPE is viewed as being similar to user equipment, while from the perspective of the user equipment, the CPE is viewed as being similar to a base station. Nonetheless, the CPE cannot truly be considered to be either user equipment or a base station. Accordingly, none of the existing LTE interfaces, such as those shown in FIG. 3 (e.g., UU interface 321/322, X2 interface 337, S1 interface 341/342), is suitable for information exchange between CPEs in accordance with an embodiment of the present invention.

Embodiments of the present invention overcome this challenge by implementing a new interface Cn 417 between CPEs 411 and 412 within SON 410. Cn 417 has some similarities to X2 interface 437 between eNodeBs 431 and 432, but is specifically designed for communication, e.g., exchange of information, between CPEs 411 and 412. On the Cn interface, a CPE may broadcast information (e.g., regarding load, capacity, and/or performance) about itself, such as the load (e.g., uplink and downlink traffic) on the CPE, the number of users served by the CPE, the devices connected to all routers on the CPE, and status (e.g., up, down, power issue, alarm, hardware issue, software issue). The CPE may also broadcast information (e.g., regarding load, capacity, and/or performance) about the CBSD to which it is currently connected, including: the PCI of the CBSD, the RSRP for the CBSD, the load (e.g., uplink and downlink traffic) on the CBSD, as well as information (e.g., regarding load, capacity, and/or performance) regarding the RF link between the CPE and the CBSD (e.g., number of sectors, power for each sector, and bit error rate). Moreover, the CPE may also rebroadcast information that it has received from other CPEs, e.g., about themselves (e.g., their resource requirements) and the CBSD(s) to which they are currently connected (e.g., their available resources).

Accordingly, a CPE can obtain information (e.g., the resource requirements) for all CPEs on the network, as well as information (e.g., the available resources) for every CBSD. Thus, a CPE can select a CBSD which has sufficient resources available (including RF resources between the CBSD and the CPE) in order to satisfy the CPE's requirements. Moreover, the CPE can select a CBSD in a manner which ensures that each CPE on the network is connected to a CBSD which has sufficient resources available to satisfy that CPE's requirements in order to optimize the overall quality of service for the network.

Figure 5:
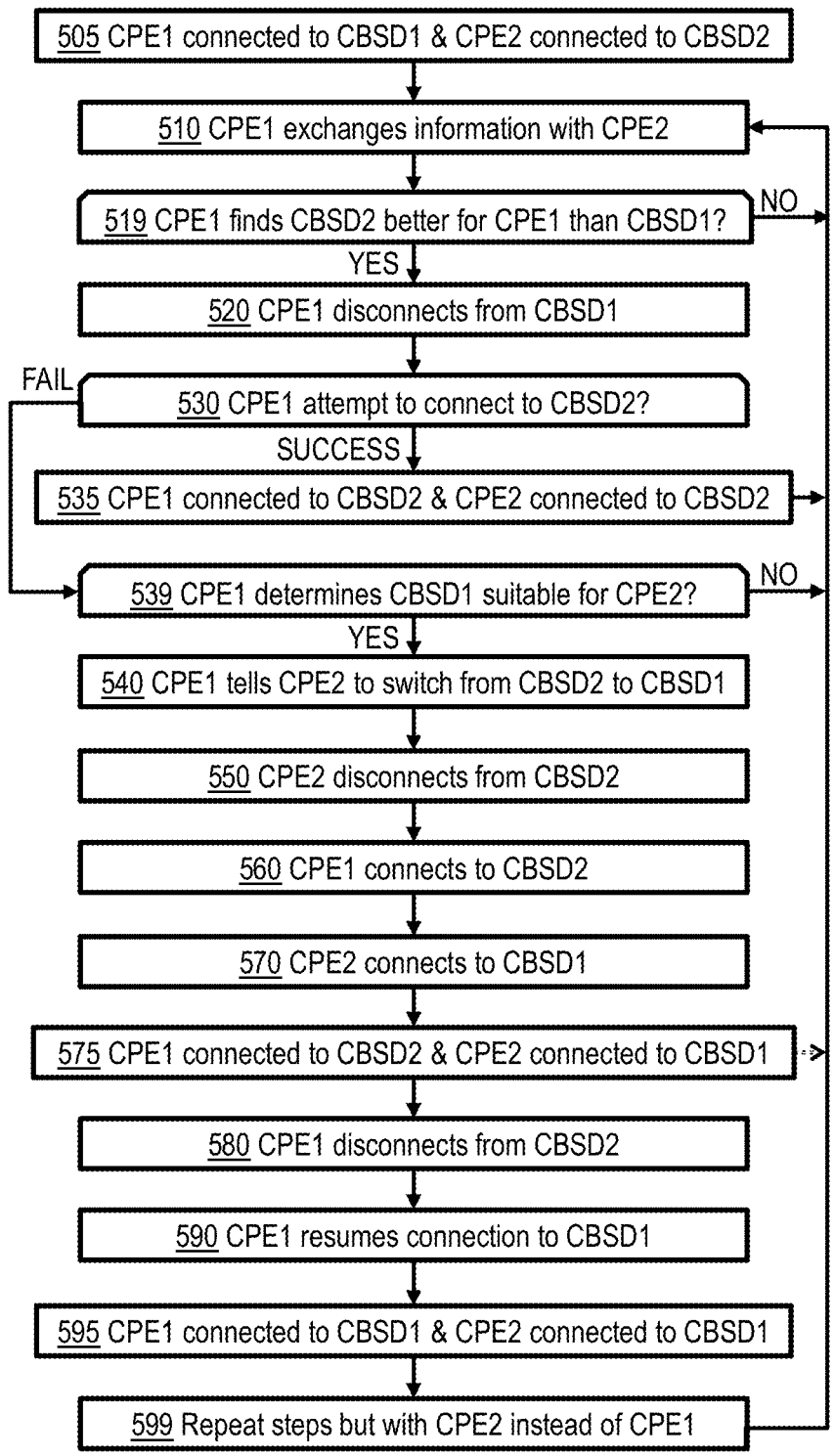
FIG. 5 is a flowchart showing a network communication process in accordance with one or more aspects of the invention.
Figure 6:
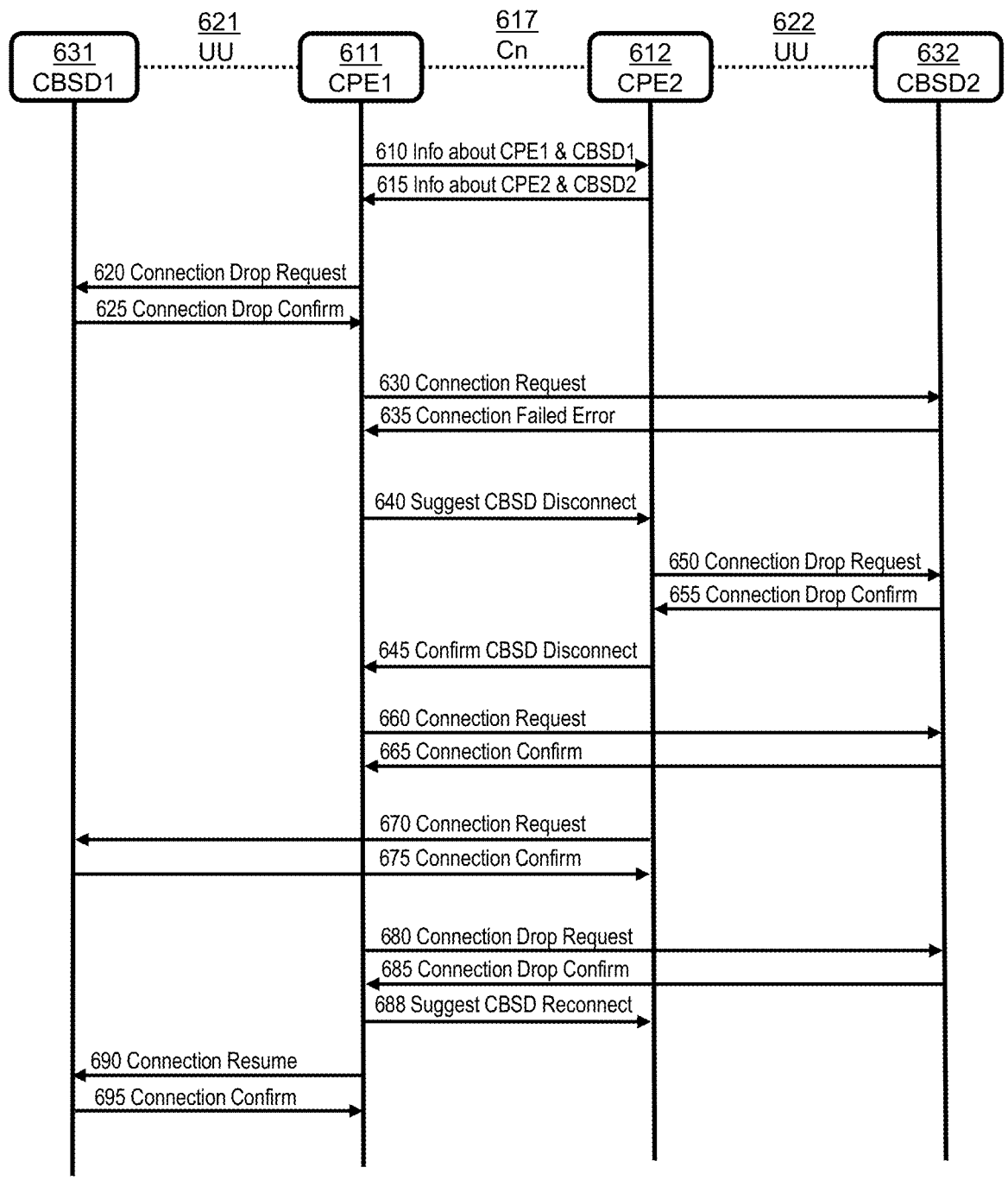
FIG. 6 is a message sequence chart for a network communication process in accordance with one or more aspects of the invention.

FIG. 5 is a flowchart, and FIG. 6 is a message sequence chart, both showing a network communication process in accordance with one or more aspects of the invention. Due to space limitations, decision points (e.g., steps which could have multiple possible outcomes) are shown in FIG. 5 as rectangles with their top corners removed, rather than being depicted with the traditional diamond shape.

Generally speaking, each step shown in FIG. 5 of the form 5x0 (1≤x≤9) corresponds to two messages shown in FIG. 6: 6x0 is an initial message associated with performance of the step 5x0, and 6x5 is a response to the initial message 6x0 associated with performance of the step 5x0. Steps in FIG. 5 of the form 5x5 indicate changes in CBSDs the CPEs are connected to, e.g., resulting from prior step(s). Steps of the form 5x9 in FIG. 5 do not have corresponding messages shown in FIG. 6.

CPEs 611 and 612, Cn interface 617, UU interfaces 621 and 622, and CBSDs 631 and 632 shown at the top of in FIG. 6 respectively correspond to CPEs 411 and 412, Cn interface 417, UU interfaces 421 and 422, and CBSDs 431 and 432 in FIG. 4. Assume that when the process begins, CPE1 611 is connected to CBSD1 631 over UU interface 621 and that CPE2 612 is connected to CBSD2 632 over UU interface 622, as shown in step 505 in FIG. 5 and at the top of FIG. 6. To enhance clarity, the remainder of the discussion will omit the reference numerals 611, 612, 617, 621, 622, 631, and 632 for the elements shown at the top of FIG. 6, and will instead refer to these elements simply as, e.g., CPE1, CPE2, CBSD1, and CBSD2.

In step 510, CPE1 exchanges information with CPE2 over the Cn interface. CPE1 transmits message 610 over the Cn interface to CPE2, including information about CPE1 611 and about the CBSD to which CPE1 is currently connected, e.g., CBSD1. Message 610 may also include information which CPE1 previously received over a Cn interface from one or more CPEs other than CPE2; such information may concern those other CPE(s) and the CBSD(s) to which the other CPE(s) are connected. CPE2 612 responds by transmitting message 615 over the Cn interface to CPE2, including information about CPE2 612 and about the CBSD to which CPE2 612 is currently connected, e.g., CBSD2 632. Message 615 may also include information which CPE2 previously received over a Cn interface from one or more CPEs other than CPE1; such information may concern those other CPE(s) and the CBSD(s) to which the other CPE(s) are connected.

In step 519, CPE1 compares the information received by CPE1 in message 615 about CBSD2 (e.g., available resources) to information about CPE1 (e.g., resource requirements) and about CSBD1 (e.g., available resources) to determine whether CBSD2 is better suited to satisfy CPE1's service requirements than CBSD1 (note that the latter information was included in message 610 transmitted by CPE1). In some embodiments, this may include a further determination that the benefit for CPE1 switching from CBSD1 to CBSD2 is of a sufficient magnitude (e.g., greater than a threshold level, which could represent an estimate of the costs associated with switching). If CPE1 does not find CBSD2 to be better suited to satisfy CPE1's service requirements than CBSD1 (in some embodiments, by at least a specified threshold), then there is no reason for CPE1 to switch from CBSD1 to CBSD2, and hence the process concludes without changing the configuration (e.g., CBSD connections) by returning to step 510 to await updated information indicating a change in resource requirements and/or availability.

However, if CPE1 determines that CBSD2 is better suited to satisfy CPE1's service requirements than CBSD1 (in some embodiments, by at least a specified threshold), the process continues to step 520 in which CPE1 disconnects from CBSD1. CPE1 transmits a Connection Drop Request 620 to CBSD1, and in response, CPE1 receives a Connection Drop Confirm 625 from CBSD 1. In step 530, CPE1 attempts to connect to CBSD2 by sending Connection Request message 630 to CBSD2. If the connection request is successful, CPE1 receives a Connection Confirm message from CBSD2, which is not shown in FIG. 6 but is similar to message 665 discussed below, and the process continues to step 535, indicating that both CPE1 and CPE2 are now connected to CBSD2, and the process concludes by returning to step 510 to await updated a change in resource requirements and/or availability.

If the connection request is unsuccessful, CPE1 receives Connection Failed Error message 645 from CBSD2. Receipt of this message suggests that CPE1 cannot connect to CBSD2 unless CPE2 disconnects from it. Thus, in step 539, CPE1 compares the information received in message 615 about CPE2 (e.g., resource requirements) and to information (included in message 610 by CPE1) about CBSD1 (e.g., resource availability) to determine whether CBSD1 would be suitable for CPE2, e.g., whether CBSD1 has sufficient resources available to satisfy CPE2's requirements, such that CBSD1 can provide an adequate level of service to CPE2.

Note that this this query is not whether CBSD1 would be better than CBSD2 for CPE2: it does not matter whether CBSD2 could provide a higher level service to CPE2, e.g., because CBSD2 has more available resources than CBSD1, so long as CBSD1 can provide an adequate level service to CPE2. By way of explanation, for example, it may be the case that CPE2 may require fewer available resources than CPE1, such that the lower level of available resources on CBSD1 will impact CPE1 less than it would impact CPE2. As previously noted, the goal is to optimize the overall level of service for the network, rather than to maximize the level of service of any specific CPE. This optimization may be subject to a condition that no CPE receive a level of service below a specified threshold (i.e., which is deemed inadequate), or in other words that every CPE receive at least a level of service which is deemed to be sufficient for that CPE.

If step 539 determines that CBSD1 (or in some embodiments as discussed below, other CBSDs on the network besides CBSD2) cannot satisfy CPE2's needs, then CPE1 does not make any changes to CPE2's configuration. Instead, CPE1 restores the initial configuration shown in step 505 by resuming its connection to CBSD1 (not shown, but similar to step 590 and message 690 discussed below), and then returns to step 510 to await updated information indicating a change in resource requirements and/or availability.

In some embodiments, step 539 could consider all CBSDs rather than only CBSD1, in order to determine whether any other CBSD besides CBSD2 could satisfy CPE2's needs. If more than multiple CBSDs besides CBSD2 could provide an adequate level of service for CBSD2, a further determination may be made as to which CBSD would be most preferable for CPE2 to connect to in lieu of CBSD2, e.g., which CBSD would provide the highest level of service for CPE2. In such embodiments, restoring the original configuration and then returning to step 510 would occur only when no other CBSD besides CBSD2 can satisfy CPE's needs. Otherwise, steps 550-575 described below would be performed in modified form, with references to CBSD1 replaced with whichever CBSD it is determined that CPE2 should connect to instead of CBSD2.

If step 539 determined that CBSD1 (or, in some embodiments, another CBSD) can satisfy CPE2's needs instead of CBSD2, then in step 540 CPE1 instructs CPE2 to switch from CBSD2 to CBSD1 (or another CBSD). Specifically, CPE1 sends a message 640 to CPE2 which at least suggests, if not commands, that CPE2 should disconnect from CBSD2 and instead connect to CBSD1. In some embodiments, message 640 will be sent only upon a further determination that the benefits (e.g., increased level of service) of CPE1 switching from CBSD1 to CBSD2 outweighs any costs (e.g., reduced level of service) of CPE2 switching from CBSD2 to CBSD1, rather than responsive solely to a determination that CBSD1 would still provide CPE2 with adequate (even if diminished) service.

Responsive to receipt of message 640 in step 540, CPE2 disconnects from CBSD2 in step 550. CPE2 transmits a Connection Drop Request 670 to CBSD2, and in response, CPE2 receives a Connection Drop Confirm 675 from CBSD2. Upon receiving the Connection Drop Confirm 675 from CBSD2, CPE2 transmits a message 665 to CPE1 indicating that CPE2 has disconnected from CBSD2 as requested by CPE1 in message 660.

In step 560, CPE1 connects to CBSD2 by sending Connection Request message 660 to CBSD2, and (assuming that the connection request is successful) CPE1 receives Connection Confirm message 665 from CBSD2. In step 570, CPE2 connects to CBSD1 by sending Connection Request message 670 to CBSD1, and (assuming that the connection request is successful) CPE2 receives Connection Confirm message 675 from CBSD1. Thus, as shown in step 575, CPE1 is connected to CBSD2 and CPE2 is connected to CBSD1. In some embodiments, represented by the dashed arrow, after step 575, the process concludes by returning to step 510 to await updated a change in resource requirements and/or availability.

However, in other embodiments, CPE1 only "borrows" CBSD2 from CPE2 in response to a temporary condition causing an increase in required resources, e.g., a surge in network activity and/or data traffic associated with the client devices coupled to CPE1. Once CPE1's resource requirements have returned to baseline levels and/or after a specified period of time has elapsed, CPE1 will switch back from CBSD2 to CBSD1.

Thus, CPE1 disconnects from CBSD2 in step 580. CPE1 transmits a Connection Drop Request 680 to CBSD1, and in response, CPE1 receives a Connection Drop Confirm 685 from CBSD2. Upon receiving the Connection Drop Confirm 685 from CBSD2, CPE1 transmits an additional message 688 to CPE2 to announce that CPE1 has disconnected from CBSD2, and that CPE2 now has the opportunity to reconnect to CBSD2 if it is desired to restore the original configuration discussed above with reference to step 505. (Recall that previously in steps 530-560, CPE2 disconnected from CBSD2 to allow CPE1 to connect to CBSD2.) In step 590, CPE1 re-connects to CBSD1 by sending Connection Resume message 690 to CBSD1, and (assuming that the connection request is successful) CPE1 receives Connection Confirm message 695 from CBSD1.

In some embodiments, CPE2 may automatically switch back from CBSD1 to CBSD2 immediately upon being notified that CPE1 has disconnected from CBSD2, but such is not the case for the illustrative embodiment shown in FIGS. 5 and 6. For example, there be instances where remaining connected to CBSD1 may still result in a higher level of service for CPE2 despite CPE1 also becoming connecting to CBSD1. Thus, in step 599, the process returns to step 510 and repeats the steps discussed above, except with the roles of CPE1 and CPE2 (and of CBSD1 and CBSD2) reversed. Thus, for example, when performing steps 519-530 this time, CPE2 attempts to switch from CBSD2 to CBSD1 responsive to determining that such a switch would be advantageous for CPE2.

Illustrative embodiments of the present invention which provide an interface for CPEs to communicate with one another may improve the efficiency of the network in other ways besides the aforementioned globally-optimal allocation of CPEs to CBRSes. As mentioned above, the information which a CPE broadcasts to other CPEs may include an indication of its status, e.g., whether that CPE is experiencing an issue such as alarm, power, hardware, or software. If a first CPE is experiencing such an issue, it may be desirable and perhaps even necessary to hand over subscribers served by the first CPE to a second CPE, which may be located proximate to the first CPE. Thus, the first CPE may broadcast a status message to other CPEs, including the second CPE, indicating that the first CPE is not operational. The second CPE, upon receiving this message, will power up to increase its coverage until the point where the second CPE sees connections from new users, who are now using the second CPE instead of the first CPE. For example, the second CPE may be a CPE-CBRS, which is capable of temporarily increasing its power to the higher levels more typically associated with a CBRS rather than a CPE.

Recapitulation

Given the discussion thus far, it will be appreciated that, in general terms, an aspect of the invention includes a method performed by a first customer premises equipment (CPE) at a first customer premises within a fixed wireless access (FWA) network comprising a plurality of base stations. The method includes connecting remotely over a first interface to a first base station of the FWA network, providing access over the first interface to the FWA network to at least a first client device locally connected to the first CPE at the first customer premises, and receiving information over a second interface from a second CPE at a second customer premises within the FWA network to modify operation of at least the first CPE. The second CPE provides access to the FWA network to at least a second client device locally connected to the second CPE at the second customer premises, and the information received from the second CPE over the second interface comprises information about operation of the second CPE.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
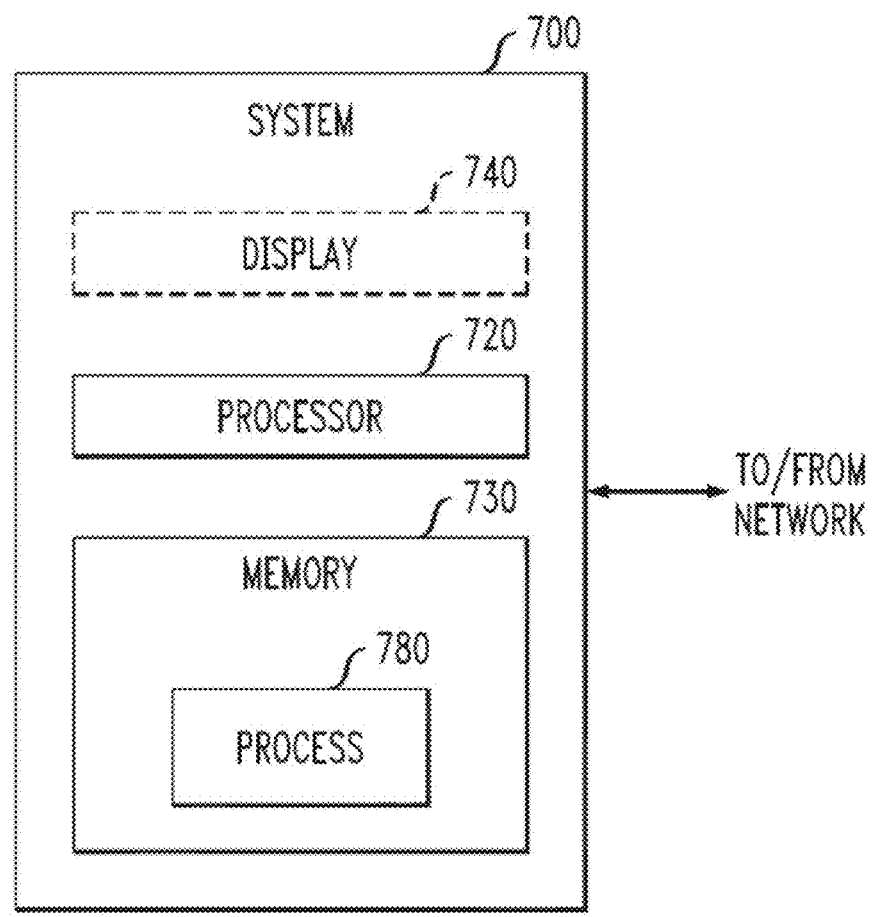
FIG. 7 is a block diagram of a computer system useful in connection with one or more aspects of the invention.

FIG. 7 is a block diagram of a system 700 that can implement at least some aspects of the invention, and is representative, for example, of one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a virtualized or non-virtualized hardware server, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method performed by a first customer premises equipment (CPE) at a first customer premises within a fixed wireless access (FWA) network comprising a plurality of base stations, the method comprising:
   connecting remotely over a first interface to a first base station of the FWA network;
   providing access over the first interface to the FWA network to at least a first client device locally connected to the first CPE at the first customer premises;
   receiving information over a second interface from a second CPE at a second customer premises within the FWA network to modify operation of at least the first CPE; and
   modifying operation of at least the first CPE based at least in part on the information received from the second CPE over the second interface;
   wherein the second CPE provides access to the FWA network to at least a second client device locally connected to the second CPE at the second customer premises; and
   wherein the information received from the second CPE over the second interface comprises information about operation of the second CPE.

2. The method of claim 1, wherein the FWA network operates according to at least one citizens band radio service (CBRS) standard, wherein the plurality of base stations of the FWA network are respective CBSDs according to the at least one CBRS standard, wherein the first interface is defined by the at least one CBRS standard, and wherein the second interface is not defined by the at least one CBRS standard.

3. The method of claim 1, wherein the FWA network operates according to at least one long-term evolution (LTE) standard, wherein the plurality of base stations are respective eNodeBs according to the at least one LTE standard, wherein the first interface is defined by the at least one LTE standard, and wherein the second interface between the is not defined by the at least one LTE standard.

4. The method of claim 3, wherein the FWA network further comprises an evolved packet core (EPC) according to the at least one LTE standard, wherein at least the first base station and a second base station of the plurality of base stations are each connected to the EPC through a respective S1 interface according to the at least one LTE standard, and wherein at least the first base station and the second base station are interconnected by an X2 interface according to the at least one LTE standard.

5. The method of claim 1, wherein the first CPE is mounted on an outside of the first customer premises, wherein at least the first end-user client device is inside the first customer premises, wherein the second CPE is mounted on an outside of the second customer premises, and wherein at least the second end-user client device is inside the second customer premises.

6. The method of claim 1, wherein the first base station is mounted on a first transmission tower and connected by fiber to a data center of the FWA network, and wherein the second base station is mounted on a second transmission tower and connected by fiber to the data center of the FWA network.

7. A method performed by a first customer premises equipment (CPE) at a first customer premises within a fixed wireless access (FWA) network comprising a plurality of base stations, the method comprising:
   connecting remotely over a first interface to a first base station of the FWA network;
   providing access over the first interface to the FWA network to at least a first client device locally connected to the first CPE at the first customer premises;

receiving information over a second interface from a second CPE at a second customer premises within the FWA network to modify operation of at least the first CPE;

wherein the second CPE provides access to the FWA network to at least a second client device locally connected to the second CPE at the second customer premises; wherein the information received from the second CPE over the second interface comprises information about operation of the second CPE; and wherein modifying the operation of at least the first CPE based at least on part on information received from the second CPE comprises, responsive to the information indicating an error condition of the second CPE, increasing power of the first CPE until at least the second client device at the second customer premises connects to the first CPE instead of the second CPE.

8. The method of claim 7, wherein once at least the second client device at the second customer premises connects to the first CPE instead of the second CPE, the first CPE at the first customer premises provides access to the FWA network to at least the first client device at the first customer premises and provides access to the FWA network to at least the second client device at the second customer premises.

9. A method performed by a first customer premises equipment (CPE) at a first customer premises within a fixed wireless access (FWA) network comprising a plurality of base stations, the method comprising:

connecting remotely over a first interface to a first base station of the FWA network;

providing access over the first interface to the FWA network to at least a first client device locally connected to the first CPE at the first customer premises;

receiving information over a second interface from a second CPE at a second customer premises within the FWA network to modify operation of at least the first CPE;

wherein the second CPE provides access to the FWA network to at least a second client device locally connected to the second CPE at the second customer premises; wherein the information received from the second CPE over the second interface comprises information about operation of the second CPE; and wherein the information received from the second CPE over the second interface further comprises information about a third CPE received by the second CPE from the third CPE over a third interface between the second CPE and the third CPE.

10. A method performed by a first customer premises equipment (CPE) at a first customer premises within a fixed wireless access (FWA) network comprising a plurality of base stations, the method comprising:

connecting remotely over a first interface to a first base station of the FWA network;

providing access over the first interface to the FWA network to at least a first client device locally connected to the first CPE at the first customer premises;

receiving information over a second interface from a second CPE at a second customer premises within the FWA network to modify operation of at least the first CPE;

wherein the second CPE provides access to the FWA network to at least a second client device locally connected to the second CPE at the second customer premises; wherein the information received from the second CPE over the second interface comprises information about operation of the second CPE; and wherein each of the first CPE and the second CPE is capable of connecting remotely to at least the first base station and a second base station of the FWA network but can be only connected to one of the plurality of base stations at a time.

11. A method performed by a first customer premises equipment (CPE) at a first customer premises within a fixed wireless access (FWA) network comprising a plurality of base stations, the method comprising:

connecting remotely over a first interface to a first base station of the FWA network;

providing access over the first interface to the FWA network to at least a first client device locally connected to the first CPE at the first customer premises;

receiving information over a second interface from a second CPE at a second customer premises within the FWA network to modify operation of at least the first CPE;

wherein the second CPE provides access to the FWA network to at least a second client device locally connected to the second CPE at the second customer premises; wherein the information received from the second CPE over the second interface comprises information about operation of the second CPE; and wherein the second CPE is connected remotely to a second base station of the FWA network, and wherein the information received from the second CPE over the second interface further comprises information about operation of the second base station.

12. The method of claim 11, wherein the information received from the second CPE over the second interface comprises information about:

at least one of a load, a capacity, and a performance of the second CPE;

at least one of a load, a capacity, and a performance of the second base station; and at least one of a load, a capacity, and a performance of a connection between the second CPE and the second base station.

13. The method of claim 11, wherein the information received from the second CPE over the second interface comprises information about:

at least one resource requirement of the second CPE; and at least one resource availability of the second base station.

14. The method of claim 13, wherein the first CPE connects to the second base station upon receiving confirmation from the second CPE over the second interface that the second CPE has disconnected from the second base station responsive to the message.

15. The method of claim 11, further comprising, responsive to a first determination by the first CPE based at least in part on the information about the second base station received from the second CPE over the second interface, disconnecting from the first base station and connecting to the second base station, wherein the first determination comprises the second base station being better for the first CPE than the first base station.

16. The method of claim 15, further comprising, responsive to a second determination by the first CPE based at least in part on the information about the second CPE received from the second CPE over the second interface, sending a message to the second CPE over the second interface instructing the second CPE to disconnect from the second base station and connect to the first base station.

17. The method of claim 16, wherein the second determination comprises the first base station being adequate for the second CPE.

18. The method of claim 16, wherein the second determination comprises benefits of the first CPE connecting to the second base station instead of the first base station outweighing costs of the second CPE connecting to the first base station instead of the second base station.

19. A computer program product usable by a first customer premises equipment (CPE) at a first customer premises within a fixed wireless access (FWA) network comprising a plurality of base stations, the computer program comprising a non-transitory machine-readable storage medium having machine-readable program code embodied therewith, said machine-readable program code being operative to cause the first CPE to perform a method comprising:
   connecting remotely over a first interface to a first base station of the FWA network;
   providing access over the first interface to the FWA network to at least a first client device locally connected to the first CPE at the first customer premises;
   receiving information over a second interface from a second CPE at a second customer premises within the FWA network to modify operation of at least the first CPE; and
   modifying operation of at least the first CPE based at least in part on the information received from the second CPE over the second interface;
   wherein the second CPE provides access to the FWA network to at least a second client device locally connected to the second CPE at the second customer premises; and
   wherein the information received from the second CPE over the second interface comprises information about operation of the second CPE.

20. A first customer premises equipment (CPE) at a first customer premises within a fixed wireless access (FWA) network comprising a plurality of base stations, the first CPE comprising:
   a memory; and
   a processor coupled to the memory and operative to perform a method comprising:
      connecting remotely over a first interface to a first base station of the FWA network;
      providing access over the first interface to the FWA network to at least a first client device locally connected to the first CPE at the first customer premises;
      receiving information over a second interface from a second CPE at a second customer premises within the FWA network to modify operation of at least the first CPE; and
      modifying operation of at least the first CPE based at least in part on the information received from the second CPE over the second interface;
   wherein the second CPE provides access to the FWA network to at least a second client device locally connected to the second CPE at the second customer premises; and
   wherein the information received from the second CPE over the second interface comprises information about operation of the second CPE.

* * * * *